Oct. 31, 1972     R. C. JOHNSON     3,701,607
DEEP HOLE DRILLING TOOL
Filed Oct. 23, 1970
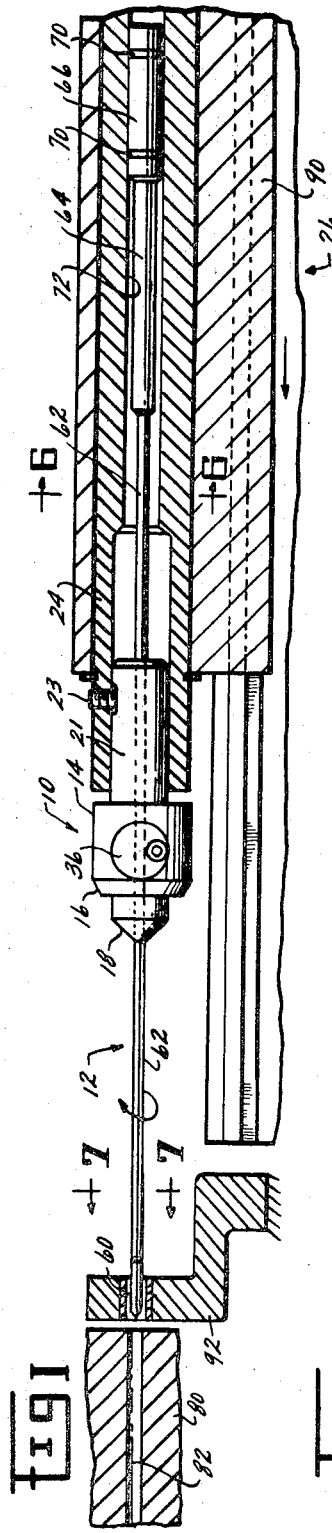
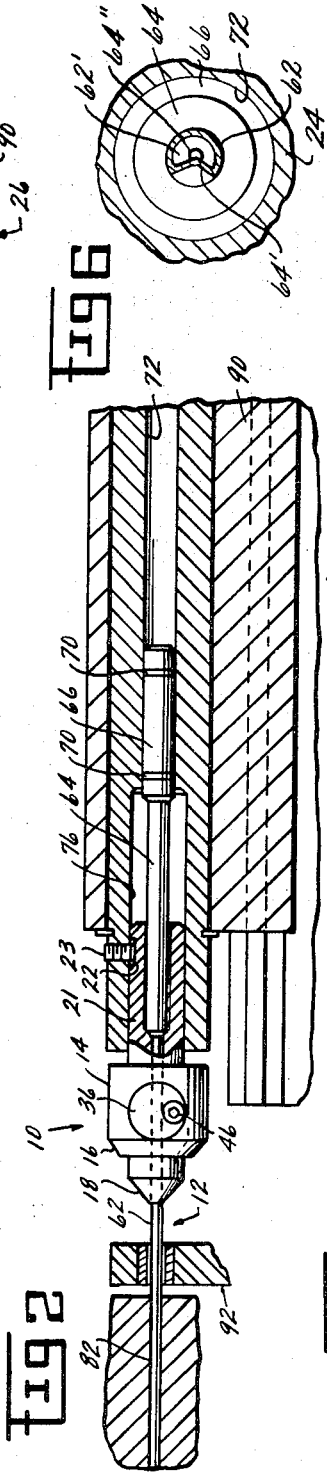
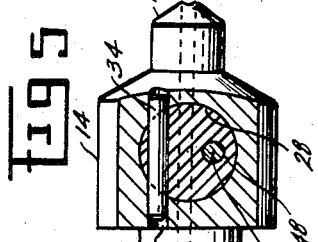
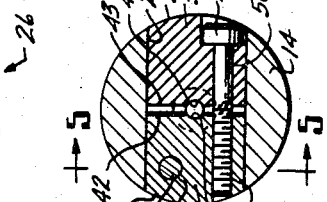
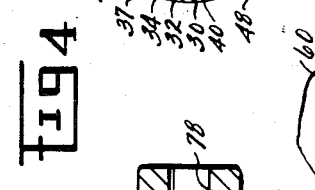
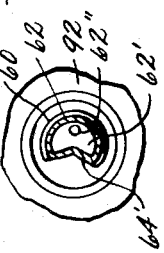
INVENTOR
ROBERT C. JOHNSON
Pearce and Schaepurklaus
ATTORNEYS

United States Patent Office 3,701,607
Patented Oct. 31, 1972

3,701,607
DEEP HOLE DRILLING TOOL
Robert C. Johnson, 9 Flower Court,
Lakeside Park, Ky.
Continuation-in-part of application Ser. No. 783,644,
Dec. 13, 1968. This application Oct. 23, 1970,
Ser. No. 83,329
Int. Cl. B23b 51/06
U.S. Cl. 408—59
2 Claims

ABSTRACT OF THE DISCLOSURE

A deep hole drilling tool which includes a cutting tip brazed to an elongated shank, a second shank integrally formed upon the first and having a greater diameter thereover, and a third shank integrally formed upon the second shank and having a greater diameter therefrom. A pair of O-rings are spacedly mounted in their respectively annular grooves about the periphery of the third shank whereby upon insertion of the third shank in a spindle mounted in a stock of a tooling machine, seepage of coolant and lubricating oil about the tool's shank is prevented and all such oils flows within the tube's bore to the cutting tip itself.

---

This is a continuation-in-part of my co-pending application Ser. No. 783,644, filed Dec. 13, 1968 and now Pat. No. 3,563,560.

This invention relates to improvements in a chuck assembly and a tool for boring long and comparatively small diametered holes in metal objects, conventionally known as gun drilling, and particularly relates to a chuck assembly for such a tool and the tool itself.

The term "gun drilling," although a misnomer, is derived from the practice of drilling long holes in gun barrels to extremely exacting tolerances. The term "gun drilling" has persisted, notwithstanding the fact that precise drilling is no olnger limited to the production of gun barrels, with the modern connotation including all precise boring operations which require a gun-type drill.

Gun drills have been found satisfactory to perform precise boring jobs in a wide variety of metals; however, many problems still exist which are common to those engaged in the business of precision boring of deep and long holes.

In boring holes of considerable depth, it is necessary to interchange drills from time to time as the depth of the hole increases with each passing of the drill. What this involves is retraction of the drill from the workpiece, removal thereof from its chuck assembly, insertion of a drill having a longer shank into the chuck assembly, and then proceeding to make the next pass into the workpiece whereby the depth of the hole is again increased. This time to exchange drills is considerable and increases the cost of manufacture of the workpiece.

Consequently, an object of this invention is to provide for a chuck assembly whereby entire retraction or removal from the workpiece of a drill is eliminated.

A further object of the invention is to provide for use of a drill having a great length of shank attached thereto, so that interchanging of drills is no longer required, but only an attachment at a different point along the extended length of a shank of the same drill is necessary.

Another object of this invention is to provide for a novel chuck assembly.

A still further object of the invention is to provide for a novel drill.

Another object of the invention is to provide for reduction of the number of stock drills of all lengths to just a few of the longer lengths of such gun drills, as the chuck assembly of this invention provides for the use of long drills in making holes of a very short depth.

Another object of this invention is to provide for a highly efficient flow of lubricating oil through the drill.

These and other objects of the invention will become more apparent upon a complete reading of the following description, appended claims thereto, and the accompanying drawing comprising one sheet, in which:

FIG. 1 is an elevational view, partly in section, of the chuck assembly and drilling tool utilized therewith and embodying this invention, in one operable position in a gun drilling machine.

FIG. 2 is an elevational view, partly in section, of the chuck assembly and drill shown in FIG. 1 in a second operable position in the gun drilling machine.

FIG. 3 is a sectional view of the chuck assembly embodying the invention.

FIG. 4 is a view taken on line 4—4 in FIG. 3.

FIG. 5 is a view taken on line 5—5 in FIG. 4.

FIG. 6 is a view in section of the drilling tool taken on an enlarged scale on the line 6—6 in FIG. 1.

FIG. 7 is a view in section of the drilling tool taken on an enlarged section on the line 7—7 in FIG. 1.

Referring now to the drawing in which reference characters therein correspond to like numerals hereinafter contained in this specification, reference character 10 refers to the chuck assembly and reference character 12 refers to the deep hole drill. Chuck assembly 10 comprises a cylindrical head 14, preferably tapered towards its front end 16, and having a cap or reduced portion 18 formed at and extending from front end 16, and being cylindrically aligned to head 14. Chuck assembly 10 further includes cylindrical shaft 21 centrally aligned with head 14. A central bore 20 extends axially throughout head 14, cap 16 and shaft 21. Shaft 21 is sufficiently long so as to include a flat 22 for attachment by means of a set screw 23 radially mounted in a rotatable spindle 24 of a gun drilling machine 26. The head, shaft and cap are preferably integrally formed by machining a single metallic piece thereto.

A diametrically formed second bore 28 extends throughout head 14 at a right angle to its major or longitudinal axis. A first plug 30 is slip-fitted in bore 28, filling substantially one-half thereof. A dowel pin bore 32 is provided in head 14 parallel to its major axis and is offset to such axis. Bore 32 opens to the front face of head 14 and extends rearwardly thereinto. A dowel pin 34 is seated in dowel pin bore 32, and upon assembly of chuck assembly 10, passes through the body of plug 30 to retain the latter in bore 28.

A second plug 36 is also slip-fitted to bore 28 from the side of head 14 opposing the side thereof from which plug 30 is inserted, filling substantially one-half of bore 28, thereby being in alignment with its complementary plug 30. The rearward faces 37, 38 of complementary plugs 30, 36, respectively, are preferably machined so as to be flush with the annular periphery of head 14. Each plug 30, 36 includes a groove 40, 41, respectively, in its centrally disposed and facing wall 42, 43, respectively. Each groove 40, 41 extends throughout the depth or width of its respective plug in a line parallel to the major axis of head 14, and generally corresponds to the shape of one-half of a shank of the deep hole tool 12 which cooperates with each of such grooves after assembly of chuck assembly 10 and during operation of such chuck assembly and tool upon a workpiece for drilling a deep hole in the latter.

Means such as an Allen screw 46 is provided for drawing together plugs 30, 36 in bore 28 and about tool 12 preparatory to use thereof. A pair of aligned holes 48, 50 are disposed in the bodies of plugs 30, 36, respectively, their coincident axes being parallel to but offset to the axes of such plugs. Allen screw 46 is threaded into plug 30 through hole 50 of plug 36 in assembly of chuck assembly 10 whereby plug 36 is drawn towards plug 30 (retained by dowel pin 34) upon tightening thereof, thereby providing for grooves 40, 41 to grip the shank of tool 12 mounted in and throughout bore 20 of chuck assembly 10.

Gun drilling tool 12 comprises a cutting tip 60 securely mounted on an elongated shank 62, a second shank 64 having a diameter greater than that of shank 62, and a third shank 66 having a diameter greater than that of second shank 64. Tip 60 is preferably brazed in conventional fashion to shank 62. The shank 62 is tubular, as shown in FIG. 6, there being a central opening 62' extending the length thereof and communicating with an opening or bore 62" (FIG. 7) which extends the length of the tip 60. A slot 64' (FIG. 6) extends the length of shank 62 whereby cooling lubricant flows to and from the cutting tip during operation of deep hole drilling in a workpiece. This type of shank and tip are more fully disclosed in U.S. Letters Patent No. 1,189,727. The opening 62' of the shank 62 also communicates with a bore 64" (FIG. 6) which extends the length of the shanks 64 and 66.

Also included in tool 12 is a pair of circumferential O-rings 70, each spaced from the other and being annularly mounted upon the third shank 66 thereof. O-rings 70 provide for sealing of tool 12 in a bore 72 provided in spindle 24 and prevent seepage of coolant which otherwise would flow through bore 72 and around tool 12 to the exterior of spindle 24. Such O-ring mountings provide for a more efficient use of the flow of the coolant oil during a gun drilling operation. In the past, oil has leaked by a tool having but a single shank, and as a result, a less efficient cooling condition occurred. However, in this invention, such problem is removed.

Spindle 24 thus appropriately provides for the bore 72 being of a size along which O-rings 70 slidably fit, thereby forcing all flow of coolant and lubricating oil into the tool bore and to its cutting tip. An enlarged spindle bore 76 is provided adjacent its end into which shank 21 of chuck assembly 10 is secured by set screw 23. A rearwardly-extending enlarged bore 78, in axial alignment with bore 20 in head 14, is provided in shank 21 for terminal axial disposition of second shank 64 of tool 12 so that O-rings 70 continue to efficiently function in bore 72 during the last pass a particular deep-hole drilling tool 12 may make in a given operation in a gun drilling machine 26.

The concept of and claim to the patentable invention extends to substitution of an adaptor for spindle 24, in which case such adaptor may be conventionally keyed or otherwise suitably secured to a rotatable spindle in gun drilling machine 26.

The assembly of chuck assembly 10 and deep-hole drilling tool 12 should now be apparent from the above description. Shank 62 of tool 12 is inserted through the rear of shank 21 of chuck assembly 10 while complementary plugs 30, 36 are loosely held in bore 28 by Allen screw 46 and dowel pin 34. Thereafter, Allen screw 46 is tightened along a desired point of shank 62 preparatory to a first pass, usually a short one, into a workpiece 80 for making a deep hole 82 therein. Third shank 64 and chuck assembly 10 are then inserted into spindle 24 until flat 22 of shank 21 is aligned with set screw 23 in spindle 24 so as to fasten chuck and tool thereto. Further adjustment of the exposed length of shank 62 of tool 12 may then be undertaken should it be desired to shorten or lengthen such exposed portion, merely by loosening and tightening Allen screw 46 accordingly.

Thereafter, in operation, spindle 24, slidably reciprocable with sub-base 90 of gun drilling machine 26, is caused to rotate with advancement as shown by the arrow in FIG. 1 of spindle 24 towards workpiece 80. Tip 60 passes through an initial guide means 92 suitably mounted on gun drilling machine 26 and begins to bore hole 82 in workpiece 80.

After the first pass of tool 12, which is limited by the extent of an exposed portion of shank 62 to the left of guide means 92 as cap 18 contacts the latter, sub-base 90 is retracted sufficiently so that thereafter, Allen screw 46 is loosened and a sufficient and an additional portion of shank 62 of tool 12 is exposed. Again, Allen screw 46 is tightened so that shank 62 is secured between plugs 30, 36. Advancement of sub-base, rotatable spindle and chuck assembly is again caused thereby making a second pass into hole 82 of workpiece 80, causing a deeper hole to be drilled thereby, the walls of the depth of hole 82 made in the first pass supporting shank 62. This procedure is repeated a sufficient number of times so as to drill to a desired depth for hole 82. Thus, needless interchange of longer and longer tools for gun drilling is eliminated, and is otherwise reduced only because of the limitation of the length of shank 62 of tool 12. The shank 64 of the tool 12 comes into contact with a base portion or face 78' (FIG. 3) of the bore 78 when the tool is in position for a final pass, as shown in FIG. 2, and engagement between the shank 64 and the base of the bore 78 prevents release of the sealing ring 70 from the bore 72. During operation of the device, coolant lubricating oil is pumped into the bore 72 by pump means (not shown) and progresses through the bore 64", the opening 62', and the opening 62" to be discharged at the end of the tip 60, and the oil returns along the slot 64' to be discharged with chips carried thereby outside the hole 72 in the workpiece 80.

Pursuant to the requirements of the patent statutes, the principle of this invention has been explained and exemplified in a manner so that it can be readily practiced by those skilled in the art to which it pertains, or with which it is more nearly connected, such exemplification including what is presently considered to represent the best embodiment of the invention. However, it should be clearly understood that the above description and illustrations are not intended to unduly limit the scope of the appended claims, but that therefrom the invention may be practiced otherwise than as specifically described and exemplified herein, by those skilled in the art, and having the benefit of this disclosure.

Therefore, what I claim as patentably novel is:

1. The combination of a deep hole drilling tool comprising in combination a first shank, a second shank mounted on said first shank and having a greater diameter thereover, a third shank mounted on said second shank and having a greater diameter over that of said second shank, the axes of said shanks being in axial alignment with each other, said shanks having a bore extending axially therethrough, and means mounted on said third shank for sealing said tool upon its disposition in a bore of a spindle or the like whereby loss of oil from flow through said tool is eliminated, with a spindle having a bore therein receiving the third shank with the sealing means in sealing relation with the interior of the bore, the spindle having a counterbore therein, and a chuck mounted in the counterbore and engageable with the first shank, the second shank being engageable with a face of the chuck when the drilling tool is at an extended position of the drilling tool with the sealing means being retained in the bore.

2. The combination as in claim 1 wherein the chuck has a through bore and a counterbore for receiving the second shank and the face is at a base of the counterbore of the shank.

References Cited
UNITED STATES PATENTS

| | | | |
|---|---|---|---|
| 2,933,321 | 4/1960 | Cascone | 279—20 |
| 971,410 | 9/1910 | Ross | 408—59 X |

FRANCIS S. HUSAR, Primary Examiner

U.S. Cl. X.R.

173—57, 149